June 29, 1926.

J. I. MISENER

METAL CUTTING TOOL

Filed Dec. 29, 1921

John I. Misener

INVENTOR.

June 29, 1926.
J. I. MISENER
METAL CUTTING TOOL
Filed Dec. 29, 1921
1,590,994
2 Sheets-Sheet 2
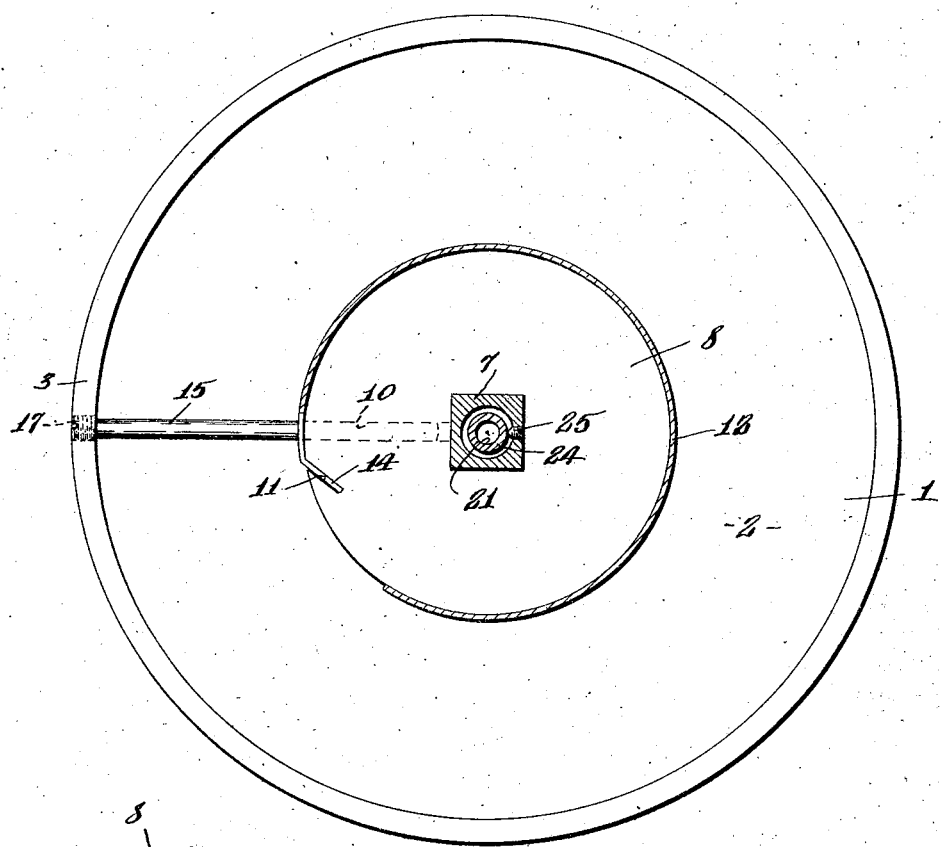
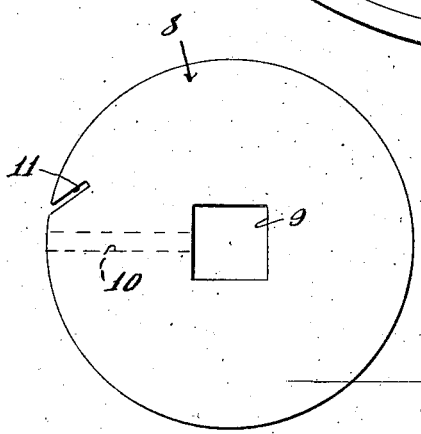
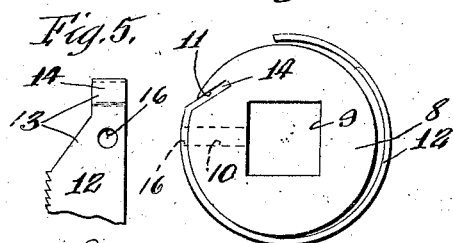
INVENTOR.

Patented June 29, 1926.

1,590,994

UNITED STATES PATENT OFFICE.

JOHN I. MISENER, OF SYRACUSE, NEW YORK, ASSIGNOR TO MISENER & IRVING MANUFACTURING CO. INC., OF SYRACUSE, NEW YORK, A CORPORATION OF NEW YORK.

METAL-CUTTING TOOL.

Application filed December 29, 1921. Serial No. 525,635.

This invention is an improved construction of my Patents, No. 1,283,258, issued October 29, 1918, and No. 1,281,627 issued October 15, 1918, and has for its object the production of a particularly simple and efficient metal cutting tool for cutting circular holes in metal etc. which is attached to the metal to be cut and automatically feeds the cutting edge to the work, and a tool operated by means of a ratchet wrench which permits its use in corners or other places where there would not be room for the use of my other tools. Another object of my invention is to provide a tool that will cut a hole of any desired diameter. Other objects will appear throughout the specification.

In describing this invention, reference is had to the accompanying drawings in which like characters designate corresponding parts in all the views.

Figure 2 is a sectional view taken on line 2—2, Fig. 1.

Figure 3 is a plan view of one of the die members.

Figure 4 is a view similar to Figure 3 with one of the cutting edges in place thereon.

Figure 5 is a fragmentary elevation of one end of one of the cutting edges.

Figure 1:
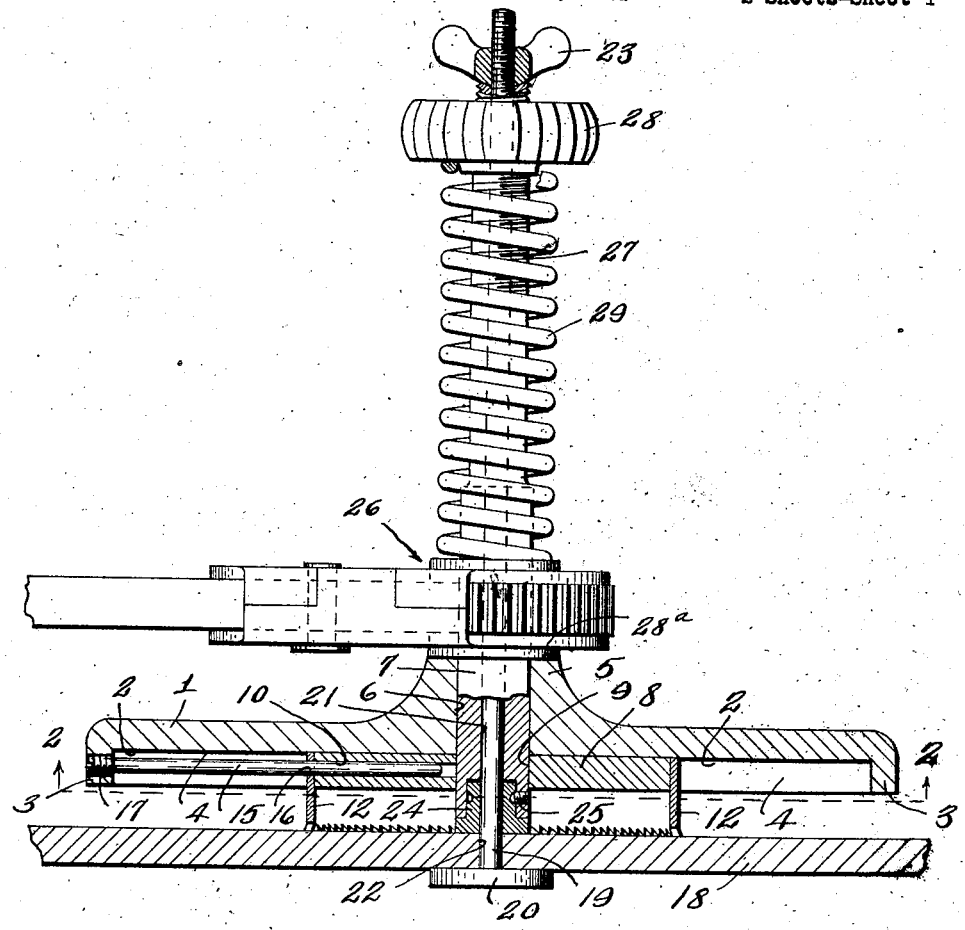
Fig. 1 is a vertical sectional view, parts being shown in elevation of my metal cutting tool.
Figure 6:
Fig. 6 is a detail view of the bearing member shown in Fig. 1.

This invention comprises generally, a rotary head, a square shaft extending axially therethrough, means coacting with the metal to be cut for clamping one end of the square shaft to the metal to be cut, a die member having an arc-shaped hacksaw fixed thereto and mounted on the square shaft on one side of the rotary head between the metal to be cut, and the rotary head, means for fixing the die member to the rotary head, a coiled spring mounted on the square shaft on the other side of the rotary head, means for tensioning said coiled spring against the rotary head, and means mounted on the square shaft between the head and the coiled spring for rotating the same.

Referring to the drawings, 1 is the rotary head which as here shown is circular in general outline and formed with a flat face 2 on one side thereof and with an annular flange 3 extending around the outer diameter thereof and at an angle thereto, thereby forming a depression 4 in one side of said rotary head, the other side of the head is formed with a hub 5.

6 is a square opening extending axially through the rotary head and 7 is a square shaft extending through the opening 6. The head is slidable axially on the shaft 7.

8 is the die member which as here shown is in the form of a flat disk having a square opening 9 in the center thereof and provided with means for holding a trailing arc-shaped hacksaw from the front end around the outer diameter thereof. Obviously the tool may be provided with any number of these die members of any desired diameter.

10 is a passage extending radially through the die member 8 from the outer diameter thereof to the opening 9 and 11 is a slot extending inwardly from and at an angle to the outer diameter of the die member 8. The slot 11 is located near the passage 10.

12 is the arc-shaped hacksaw which as shown in Figs. 2, 4 and 5 is cut away as at 13 on one end thereof and a portion of the part 13 is bent inwardly as at 14 to correspond to the angle of the slot 11 in the die member 8.

The die member 8 is slidably mounted on one end of the shaft 7 with one flat face thereof against the flat face 2 of the rotary head 1. The hacksaw 12 is then placed in position around the outer circumference of the die member with the end 14 thereof in the slot 11 of said die member and with the back of the hacksaw abutting against the flat face 2 of the rotary head as illustrated in Fig. 1.

Means is provided for holding the die member against the flat face of the rotary head, and for locking the bent in end of the hacksaw in the slot 11 and as here shown comprises a pin 15 extending radially through the part 3 of the rotary head, through a hole 16 in the end of the hacksaw and into the passage 10 of the die member. The head of the pin 15 is provided with threads 17 which thread through the part 3 of the rotary head.

In Fig. 1, 18 represents the metal to be cut and 19 a rod having a head 20 for coacting with said metal to center the tool and hold the shaft 7 against the metal. As here shown, the shaft 7 is formed with a passage 21 therethrough and the rod 19 passes through a hole 22 in the metal through the passage 21 in the shaft and a thumb screw 23 threads on the end of the rod. 24 is a bearing member which is placed on the rod 19 between the metal 18 and the end of the shaft 7, and is loosely held in the end of said shaft by means of the set screw 25.

26 is a ratchet wrench for turning the shaft 7 as this wrench forms no part of this invention further description thereof is deemed unnecessary.

The square shaft 7 extends beyond the hub 5 of the rotary head, the outer end thereof being rounded and threaded as shown at 27 and a hand wheel 28 turns on said rounded end. The ratchet wrench is slidably mounted on the squared portion of the shaft 7 with one side thereof abutting against the flat face 28ª of the hub 5 and a coiled spring 29 encircles said shaft and is interposed between the other side of the wrench and the hand wheel 28.

In use, a die member 8 of the desired diameter is placed on the square shaft 7 with one flat side thereof against the flat face 2 of the rotary head, the saw 12 is then placed around the outer diameter of the die member and locked in place by means of the pin 15. The hole 22 is then drilled in the metal to be cut and the tool fixed to the metal by means of the rod 19 and the thumb screw 23. The hand wheel is then adjusted to get the proper tension on the spring 29.

Obviously, a tool held as illustrated equalizes the pressure of the saw teeth against the metal to be cut and the cut made by the saw will be a uniform depth at all times and by the use of the ratchet wrench a very small oscillating movement of the handle of said wrench will operate the tool.

What I claim is:

1. A metal cutting tool including a rotary head, die members of various sizes and a trailing arc-shaped hacksaw, and a member for attaching the die members to the rotary head and attaching the trailing arc-shaped hacksaw from the front end thereof, to the die members.

2. A metal cutting tool including a rotary head having a substantially flat face, die members of various sizes, comprising flat disks having a slot in their outer circumference, and a trailing arc-shaped hacksaw having its front end bent in, and means for holding the die member against the flat face of said rotary head and locking the bent in end of said hacksaw in said slot.

3. A tool for cutting circular holes in metal, comprising a rotary head having a substantially flat face on one side, and an annular flange around the outer diameter thereof, a square shaft extending axially therethrough, die members of various sizes comprising flat disks having an inwardly extending slot in their outer circumference, mounted on the square shaft against the flat face of the rotary head, an arc-shaped hacksaw held from its front end around the outer circumference of said disk, with the back face thereof against the flat face of said head and the front end thereof extending into said slot, a pin extending radially through said flange, front end of said hacksaw and into said die member.

4. A tool for cutting circular holes in metal, comprising a rotary head having a flat face on one side thereof, and an annular flange around the outer diameter, a square shaft extending axially therethrough, die members of various sizes, comprising flat disks having an inwardly extending slot in their outer circumference mounted upon said square shaft, an arc-shaped trailing hacksaw having one end thereof in said slot and a pin extending radially through said flange, hacksaw and into said die member for holding the hacksaw around the outer circumference of the die member, locking one end of said hacksaw in the slot of said die member and holding the said die member on the square shaft, substantially as and for the purpose set forth.

In testimony whereof, I have hereunto signed my name, at Syracuse, in the county of Onondaga and State or New York, this 5th day of November, 1921.

JOHN I. MISENER.